Figure 6:
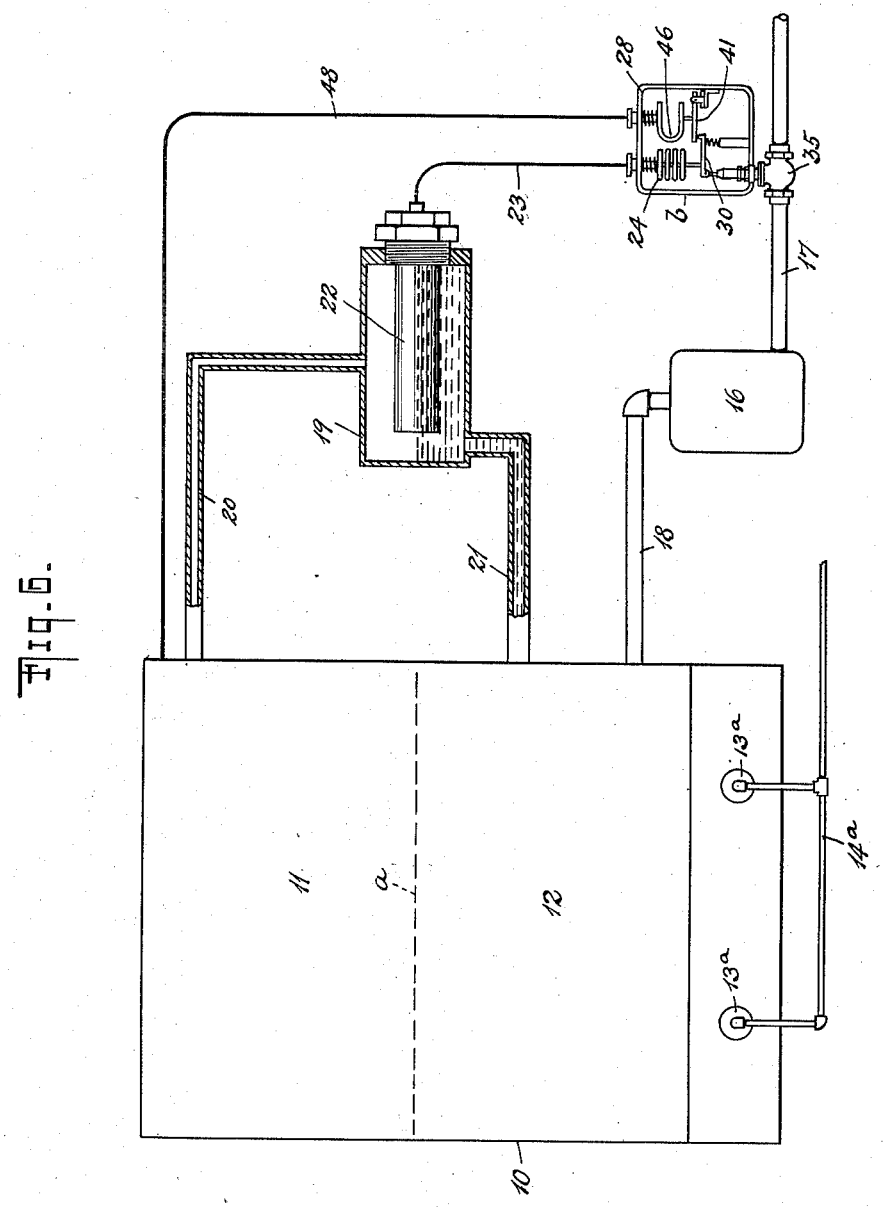

Nov. 24, 1925.
H. P. MILKER
1,563,097
AUTOMATIC CONTROLLER FOR LIQUID LEVELS
Filed March 1, 1921    13 Sheets-Sheet 1
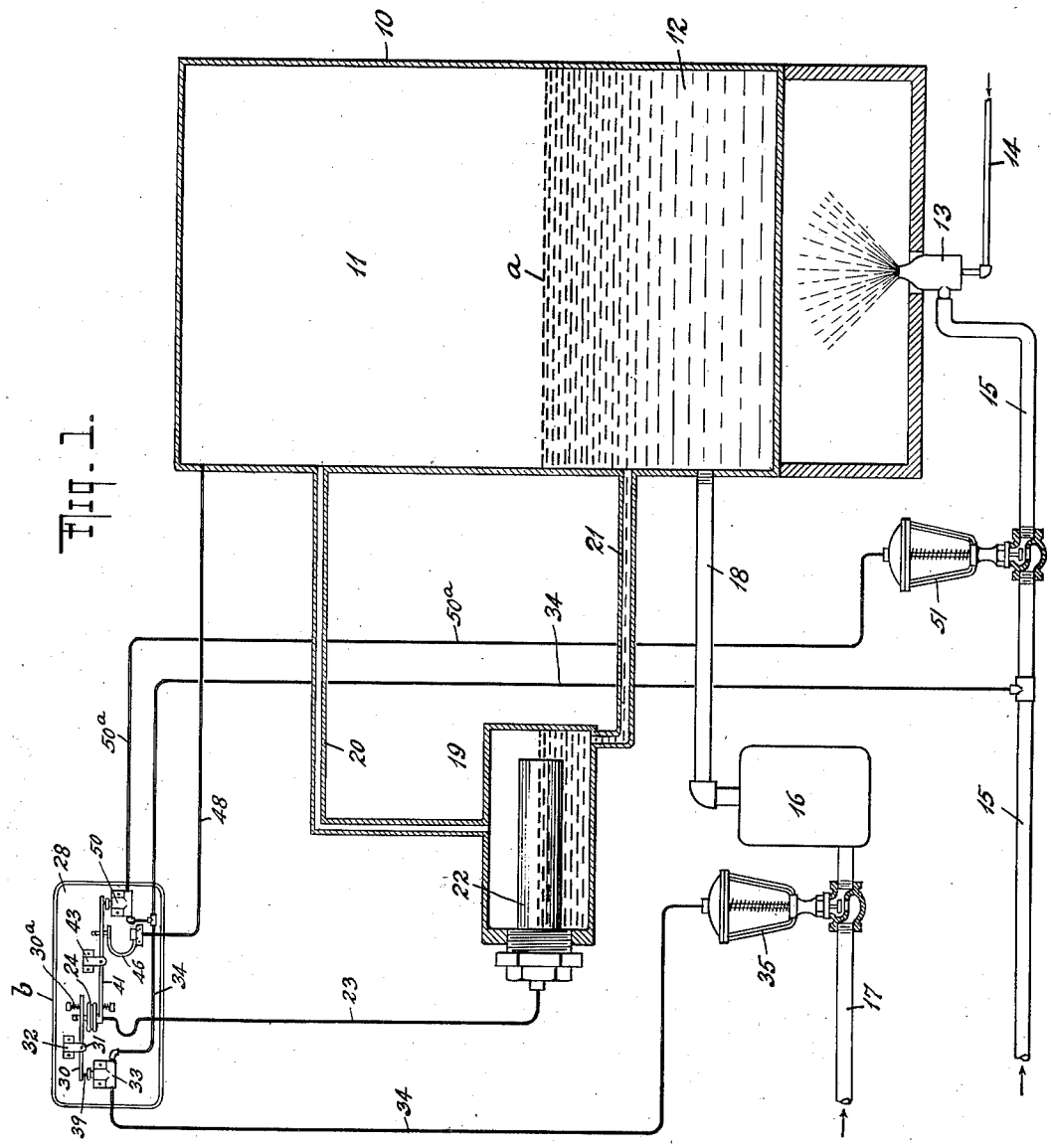
WITNESSES
INVENTOR
HERBERT P. MILKER
BY
ATTORNEYS

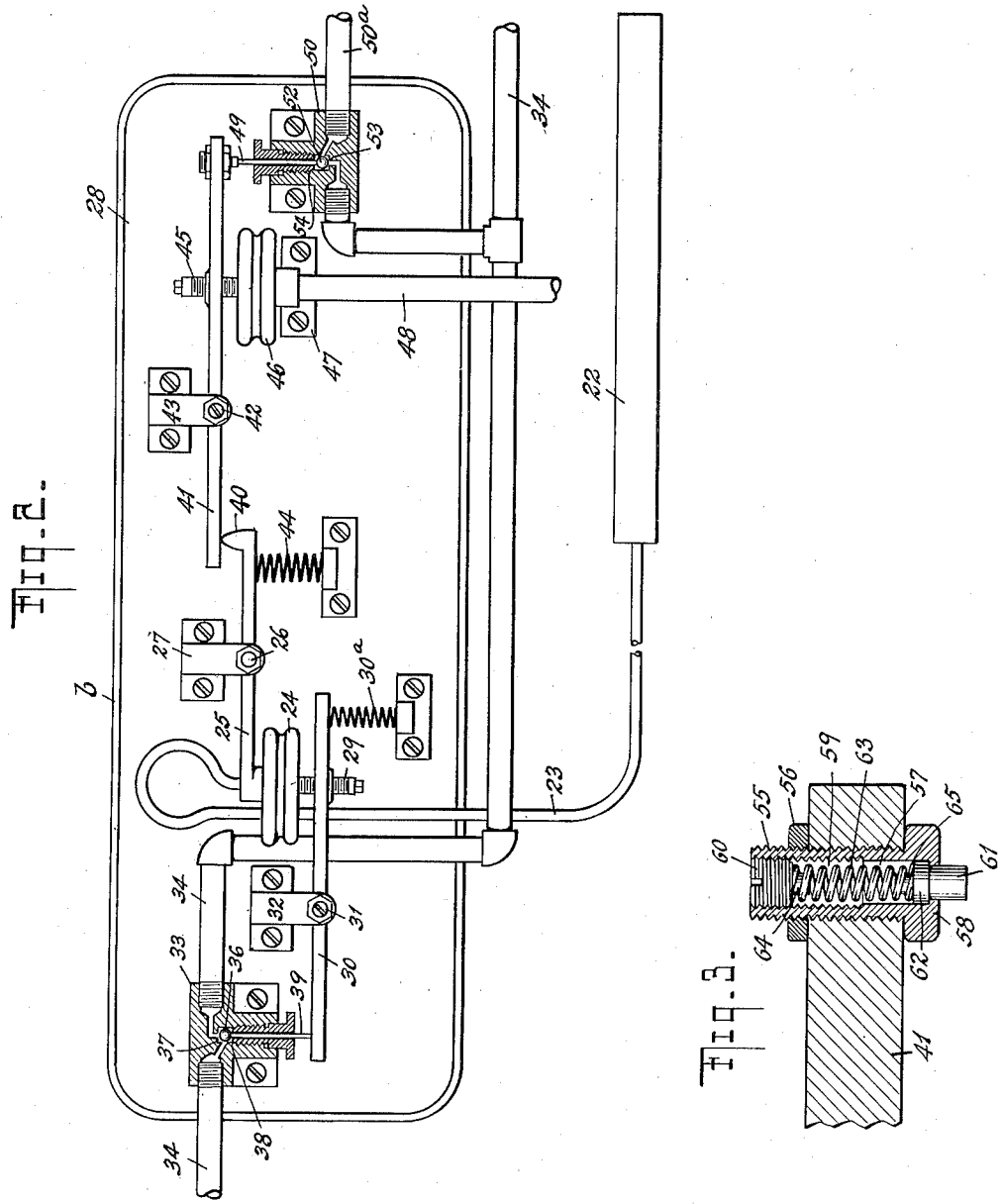

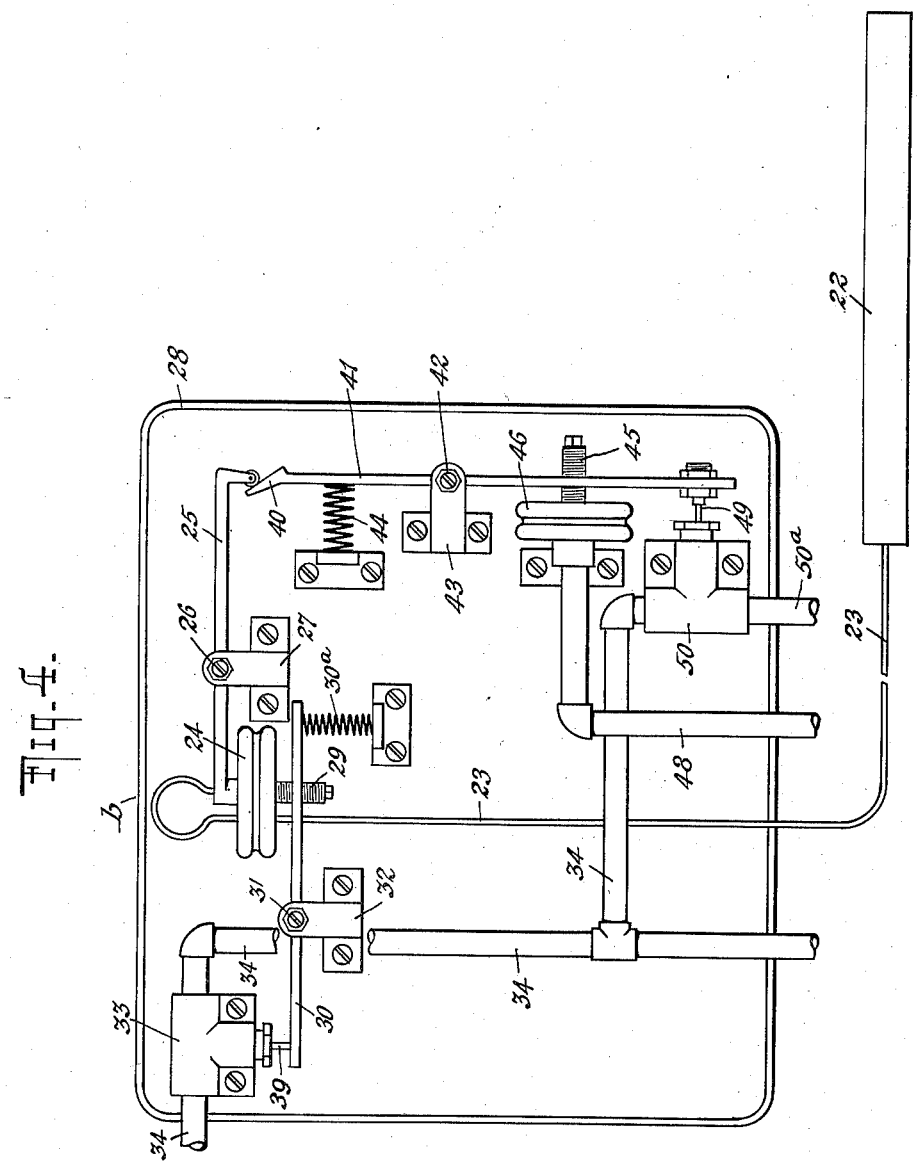

Nov. 24, 1925.                                                              1,563,097
                              H. P. MILKER
               AUTOMATIC CONTROLLER FOR LIQUID LEVELS
                     Filed March 1, 1921      13 Sheets-Sheet 4

Fig. 5.

WITNESSES

INVENTOR
                                                         HERBERT P. MILKER
                                                              BY
                                                                   ATTORNEYS

Nov. 24, 1925.   1,563,097
H. P. MILKER
AUTOMATIC CONTROLLER FOR LIQUID LEVELS
Filed March 1, 1921   13 Sheets-Sheet 6

WITNESSES

INVENTOR
HERBERT P. MILKER
BY
ATTORNEYS

Nov. 24, 1925.

H. P. MILKER 1,563,097

AUTOMATIC CONTROLLER FOR LIQUID LEVELS

Filed March 1, 1921     13 Sheets-Sheet 8

WITNESSES

INVENTOR
HERBERT P. MILKER
BY
ATTORNEYS

Nov. 24, 1925.

H. P. MILKER 1,563,097

AUTOMATIC CONTROLLER FOR LIQUID LEVELS

Filed March 1, 1921     13 Sheets-Sheet 9

Fig. 10.

WITNESSES

INVENTOR
HERBERT P. MILKER
BY
ATTORNEYS

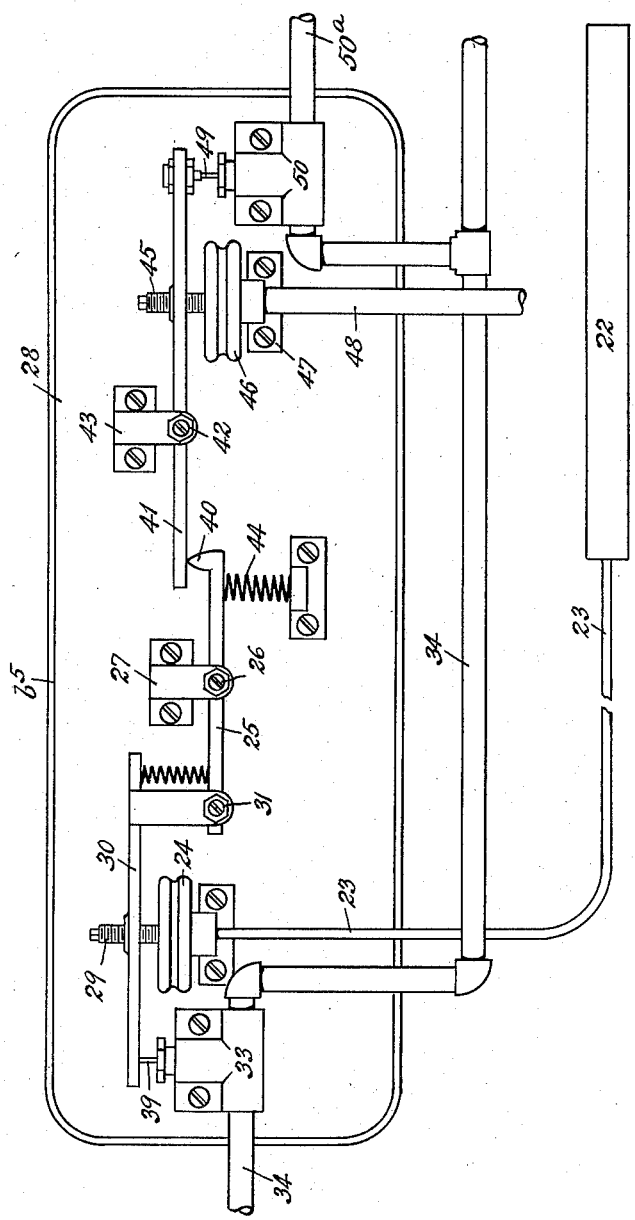

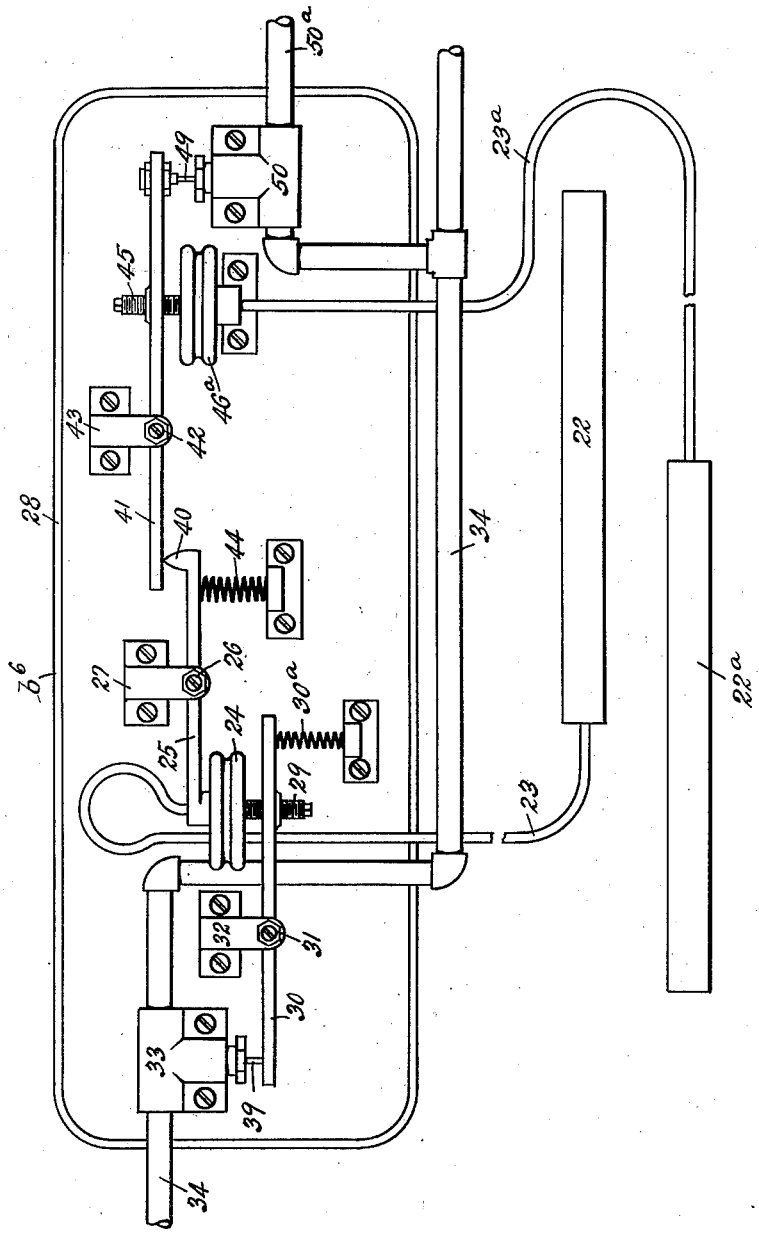

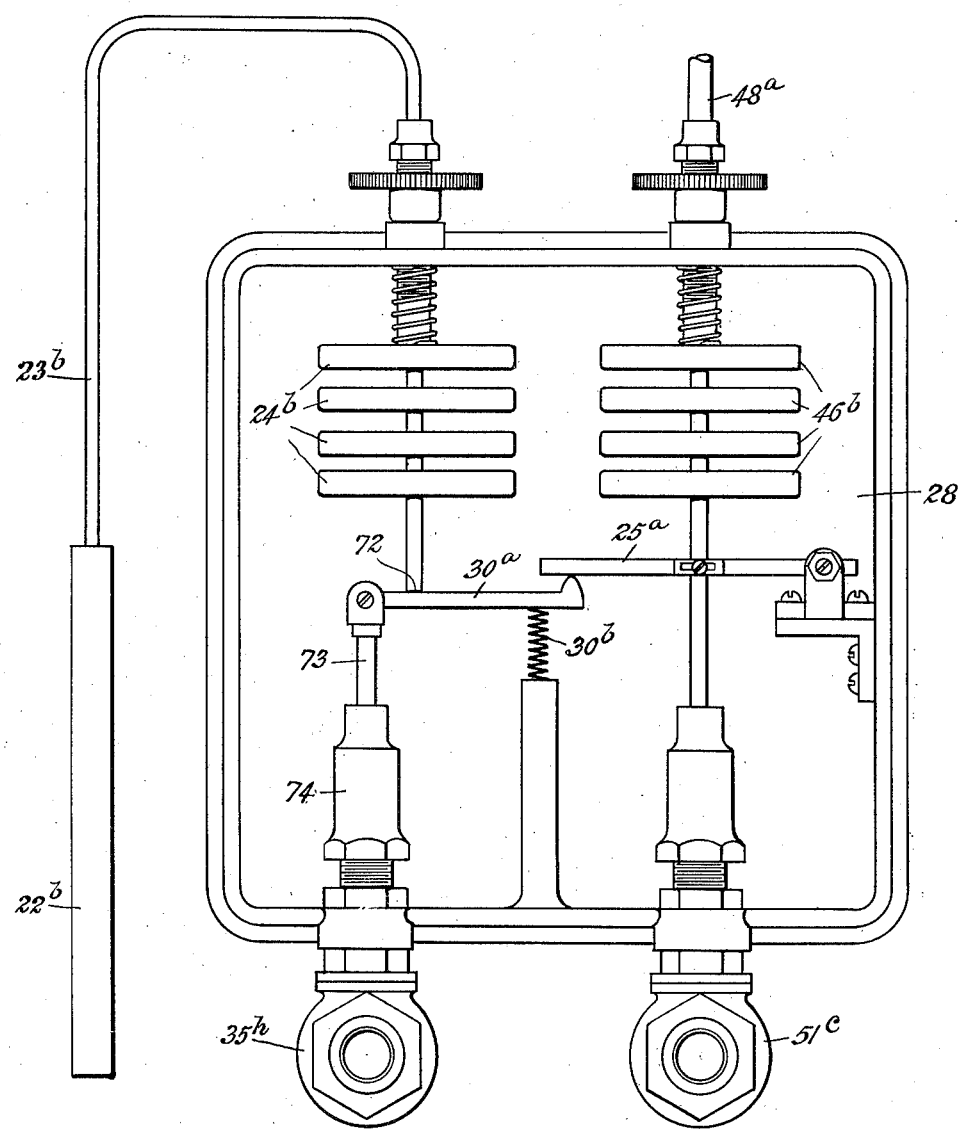

Nov. 24, 1925. 1,563,097
H. P. MILKER
AUTOMATIC CONTROLLER FOR LIQUID LEVELS
Filed March 1, 1921 13 Sheets-Sheet 13
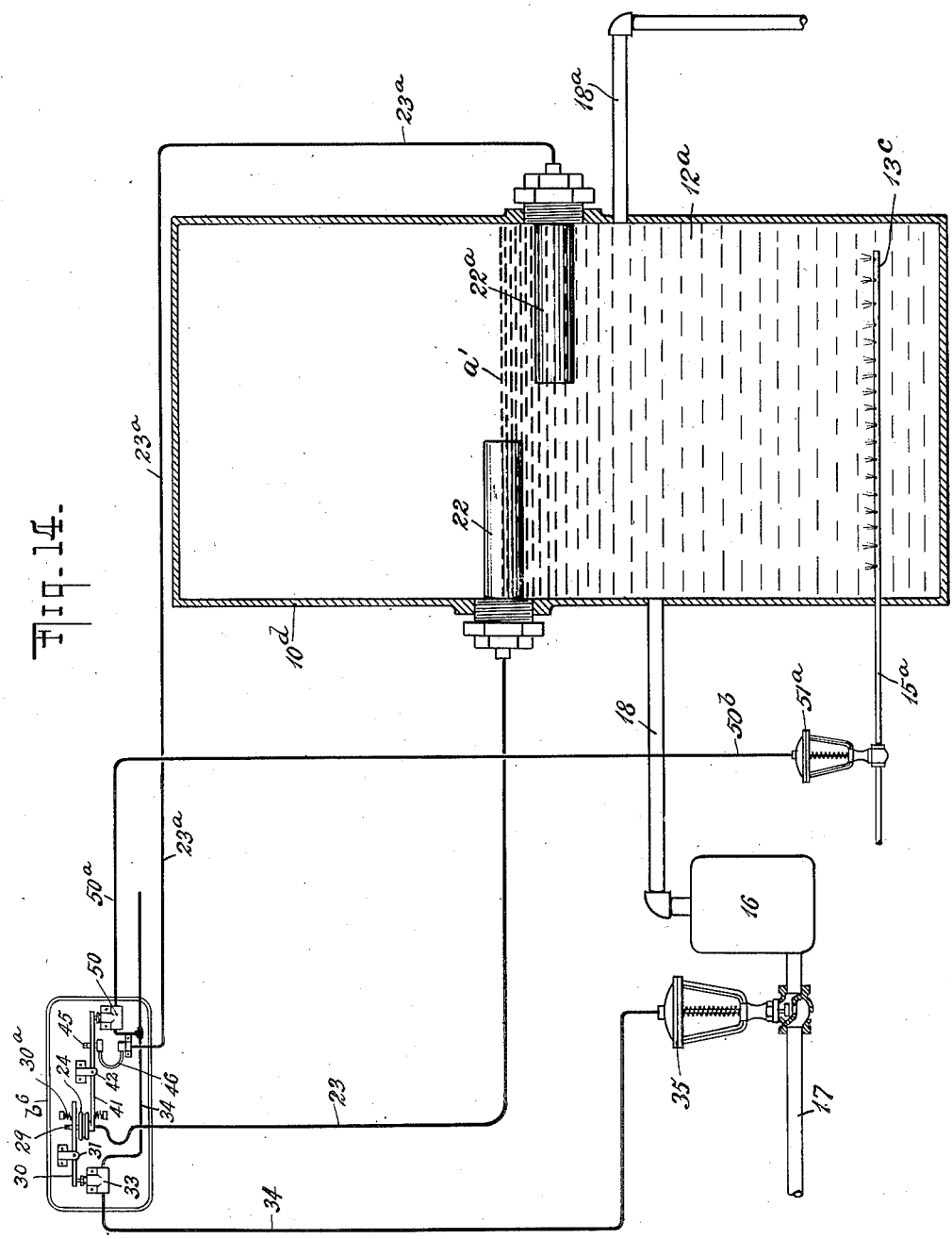
WITNESSES
INVENTOR
HERBERT P. MILKER
BY
ATTORNEYS Patented Nov. 24, 1925.

1,563,097

UNITED STATES PATENT OFFICE.

HERBERT P. MILKER, OF BROOKLYN, NEW YORK, ASSIGNOR TO CHARLES J. TAGLIA-BUE MANUFACTURING CO., OF BROOKLYN, NEW YORK, A CORPORATION OF NEW YORK.

AUTOMATIC CONTROLLER FOR LIQUID LEVELS.

Application filed March 1, 1921. Serial No. 448,818.

*To all whom it may concern:*

Be it known that I, HERBERT P. MILKER, a citizen of the United States, and resident of the borough of Brooklyn, county of Kings, city and State of New York, have invented certain new and useful Improvements in Automatic Controllers for Liquid Levels, of which the following is a specification.

My invention relates to automatic controllers for liquid levels, particularly when said liquids are heated or refrigerated and while applicable to a great variety of apparatus, such as evaporators, multiple effects, service tanks, size boxes, etc., is especially adapted for steam boilers. The invention has for its object the provision of a simple and efficient construction for the automatic maintenance, through thermostatic means, of a constant level of the liquid regardless of the latter's temperature and for automatically maintaining the water level in a steam boiler regardless of boiler pressure variations, and whereby the steaming rate of the boiler may be automatically changed in accordance with changes in the boiler pressure. Other more specific objects of my invention will appear from the description hereinafter and the features of novelty will be pointed out in the appended claims.

For the sole purpose of illustration and description and without any intent to define its limits, I have chosen to illustrate the invention in operative combination with steam boilers, reference being had to the accompanying drawings in which Fig. 1 is a diagrammatic view showing the controller operatively combined with a boiler heated by means of an atomizer type of liquid fuel burner; Fig. 2 is a detail view of one form of the automatic controlling unit on an enlarged scale, Fig. 3 is a sectional view showing a detail in the construction of the controlling unit and Figs. 4 to 14 inclusive are views illustrating variations of the invention.

Before proceeding with the description of the present invention, it may be well to state that a more or less well known arrangement for maintaining a constant level of water in a steam boiler includes a thermostat and a chamber provided at one side of the boiler and on a level with the water line that is to be maintained. This chamber has its upper portion connected by means of an equalizer with the steam space of the boiler and is also connected with the water space thereof and is thus normally half full of steam and half full of water, the latter rising and falling in said chamber concurrently with any changes in the water level in the boiler just as it does in an ordinary water gage glass. If this chamber is somewhat removed from the boiler, the water contained in said chamber will be of lower temperature than that of the steam therein which latter will be of the same temperature as the steam in the boiler. The radiation from said chamber will lower the temperature of the water but not of the steam because of the pressure equalizer and the steam pressure will be the equivalent of the boiler pressure and, consequently, of a constant temperature for a constant steam pressure, regardless of radiation.

The sensitive stem of the thermostat projects into such chamber so that normally the lower half of the stem is covered by water and its upper half by steam. If the water level now recedes and thus exposes more of the stem to the steam, said stem will become hotter and if the water level rises and thus covers more of said stem, it will become cooler. In this manner, temperature changes are brought about whereby the thermostat is caused to start and stop or accelerate and retard the feed water inflow to the boiler. However, if the boiler pressure does not remain constant, the setting point of the thermostat must be manually changed for each particular boiler pressure because even with the assistance of automatic and mechanical devices, it is very often impossible to keep the boiler pressure uniform, particularly if sudden demands are made for steam in excess of the steaming capacity of the boiler.

The present invention overcomes the disadvantages of such existing arrangements by automatically changing the setting point or automatically changing the functioning of the thermostat in exact accordance with temperature changes in the liquid or with boiler pressure changes, thus obviating the necessity for any manual setting of said thermostat. Furthermore, with the present invention, the automatic device which changes the temperature at which the thermostat functions, may, if desired, be utilized for also automatically controlling the heat supply to the apparatus by operating the steam valve of the heating coil, for instance, or, in the case of a steam boiler, for automatically decreasing and increasing the draft or the fuel supply when the boiler pressure rises above or falls below the desired steam pressure and the majority of the accompanying drawings accordingly include, as one unit, a combined water level thermostat and steam pressure regulator although the pressure section of such unit may be used only for changing the point at which the thermostat begins to function, as also illustrated.

Referring now to Fig. 1 of the drawings, 10 may represent a steam boiler of the type commonly found in steam driven automobiles, in which 11 is the steam space in said boiler and 12 the water space therein, the normal level of the water being indicated at $a$. In the example shown the boiler 10 is heated by means of a liquid fuel burner 13 of the atomizer type which is connected with a source of fuel by means of a pipe 14, and with a source of air under pressure by means of a pipe 15. It will be understood that automobile steam boilers are generally of the coil type or of the tube type but as this forms no part of the present invention, the details of construction have been omitted from the diagrammatic view, nor has it been deemed necessary to include in the illustration the customary pilot light whereby the burner is ignited, as these features are well known. In the diagram, Fig. 1, 16 represents a boiler feed pump of any well known type which is connected with the water inlet pipe 17 and whereby water is forced into the boiler by way of the pipe 18 which establishes communication between said pump and the boiler. The water level chamber is indicated at 19 and is located at a distance from the boiler 10 with its horizontal median line approximately in registry with the water level $a$ intended to be maintained in said boiler; the chamber 19 is connected with the steam space 11 of the boiler 10 by a pipe 20, and with the water space 12 by a pipe 21, the two pipes 20 and 21 preferably communicating with said chamber 19 respectively at the top and bottom thereof, as shown in Fig. 1.

A member sensitive to temperature changes, which in the illustrated example, is shown in the form of a thermostatic bulb 22, is connected with the water level chamber 19 and projects into the same in such a position that the normal water level line $a$ is in registry with the major or longitudinal axis of said bulb 22; in other words, the latter is half above and half below said water level line in a lengthwise direction. The sensitive member or bulb in the present case is operatively connected with the thermostat or its equivalent of the regulating unit $b$, by means of a capillary tube 23 which leads to and communicates with a device responsive to changes in the sensitive member or bulb 22 caused by temperature variations, this device in the illustrated example being shown in Fig. 2 as a capsular spring 24. The latter in the arrangement under discussion is not fixed and rigidly supported so as to occupy a stationary position, but may be said to be floating and, as shown, is mounted upon one end of an intermediate lever 25 pivoted at 26 upon a bracket 27 connected with a suitable support 28. The capsular spring 24 is in registry and co-operates with a projection, preferably in the form of an adjustable screw 29 carried by water-level lever 30 pivoted at 31 upon a bracket 32 also mounted upon the support 28; a spring 30$^a$ serves to maintain the screw 29 at all times in engagement with the capsular spring 24. The lever 30 is arranged to actuate an air valve 33 located in a branch pipe 34 which is connected with a source of air under pressure, for instance, by being connected with the compressed air pipe 15 (Fig. 1) and which communicates also with the diaphragm chamber of a diaphragm motor valve 35 of any customary construction located in the water inlet pipe 17 and controlling the communication between said pipe 17 and the pump 16. The air valve 33 which may be of any suitable type is shown as comprising a ball 36 co-operating with the seats 37 and 38 to open and close the air connection and the exhaust passage respectively and which itself is controlled by a stem 39 loosely fitting and extending lengthwise of the exhaust passage into contact with the water level lever 30. The diaphragm motor valve 35, as shown, is maintained in and moved toward its open position by means of a suitable spring and is actuated toward its closed position by air pressure upon the diaphragm in its diaphragm chamber, this being a well known construction and arrangement.

At the end opposite to that at which the capsular spring 24 is located, the intermediate lever 25 is provided with a projection in the nature of a cam 40 which engages a steam pressure lever 41 pivoted at 42 upon a bracket 43 fastened upon the support 28; the cam 40 is maintained in contact with said lever 41 through the medium of a spring 44 which exerts a pressure against the intermediate lever 25 (as shown in Fig. 2). The steam pressure lever 41 is provided also with a projection preferably comprising an adjustable screw 45 which bears against a pressure responsive member illustrated in the form of a capsular spring 46 fixed upon a bracket 47 secured to the support 28. The capsular spring 46 communicates, by means of a pipe 48, with the steam space 11 of the boiler 10, so as to be responsive to the pressure therein, as clearly shown in Fig. 1. The steam pressure lever 41 is arranged to actuate the stem 49 of an air valve 50 connected with the branch pipe 34 and by a pipe 50ª with the diaphragm chamber of a diaphragm motor valve 51 controlling the air pipe connection 15 with the burner 13. The air valve 50 may be of any suitable type and, as shown, is similar in construction to the air valve 33 and likewise includes a ball 52 co-operating with seats 53 and 54 to open and close the air connection and the exhaust passage respectively, said ball 52 being controlled by the stem 49; the diaphragm motor valve 51 may, like the valve 35, be of the type in which a spring moves the valve toward its open position and pressure upon the diaphragm moves said valve toward its closed position. In some instances, the valve 51 may be replaced by other types of valves adapted for regulating both air and fuel pressures. In order to permit of an additional movement of the lever 41 under the action of the capsular spring 46 as will be hereinafter fully explained, after the stem 49 has been moved fully inward of the valve 50, I prefer to provide an arrangement such as is illustrated, by way of example, in Fig. 3. This arrangement may comprise an externally screw-threaded bushing 55 screwed into the lever 41 at the proper point and fixed in place by means of a lock-nut 56 or in any other way; the bushing is provided with an axial chamber 57 having a reduced outlet at one end whereby an annular flange 58 is formed and at its other end communicating with an internally screw-threaded bore 59 in which a screw plug 60 is located. The device includes further a plunger 61 which projects through the reduced outlet of the chamber 57 and is constructed with an annular shoulder 62 which, by engagement with the annular flange 58, prevents the plunger 61 from being forced outwardly through said outlet. A coil spring 63 is located within the chamber 57 and bears with its one end against the plug 60 and with its other end against the plunger 61, whereby the latter is capable of yielding inwardly under pressure exerted in the direction of the axis of said bushing 55; to prevent unintentional displacement of the spring 63, studs 64 and 65 projecting respectively from the plug 60 and plunger 61 may extend into said spring as shown in Fig. 3. The tension of the spring 63 and, consequently, the resiliency of the plunger 61 may be adjusted by changing the position of the plug 60, or, in other words, by screwing the latter inwardly or outwardly in the bore 59.

In the arrangement so far described and illustrated in Fig. 1, the regulating unit is shown in operative combination with a steam boiler of the type commonly found in a steam driven automobile and the thermostatic portion of said unit is shown as of the commonly used "air-operated, distance type", it being understood that many other forms or types of thermostats may be used if desired; likewise, the pressure regulator portion of the unit which is shown as of a type similar to the illustrated thermostat, may also be of any other suitable form. In addition to this, in the regulating unit as shown, the functioning point of the thermostat portion is automatically changed by the pressure regulator portion, which, as illustrated in Figs. 1 and 2, is constructed to float the capsular spring of the thermostat; it will be obvious that equivalent results would be obtained, for instance, by causing the pressure regulator to float the air valve of the thermostat or the adjustable contact screw thereof, as will appear more clearly hereinafter. Furthermore, the fuel burner may be different than the atomizer type of burner included in the illustrated example, the simple varying of the air pressure in this case changing the intensity of the flame. Whether this type of burner is used or not is immaterial as the control unit may readily be arranged to regulate the heat supply by automatically varying either the air or fuel pressure to the burner or by turning on and off a plurality of burners when an increase or decrease in heat is desired; examples of these suggested arrangements are illustrated and described further on in the description.

It will be understood that the invention in addition to being applicable to various types of steam automobiles having different arrangements of steam generating systems, is equally well adapted for combination with various forms of portable and stationary steam plants, steam driven vessels and locomotives, in addition to other liquid level control applications previously mentioned. The following description of operation will, therefore, be read with the understanding that it relates to an example of the invention which is not intended to define its limits.

As long as there is no change in the steam pressure and the water in the boiler 10 remains at its intended level so that half of the bulb 22 is submerged in water and the other half is exposed to contact with steam in the chamber 19, the parts will occupy approximately the position illustrated in which the valves 35 and 51 are automatically adjusted accordingly. When, however, the water level in the chamber 19 falls, concurrently with a drop in the water line $a$, without any change in the steam pressure, and thus uncovers the bulb 22 to a greater extent than before, a larger surface area of said bulb is as a result exposed to the effect of the steam which is of higher temperature than said water. Because of this the temperature of the bulb is raised and as a result causes the capsular spring 24 to expand. Due to the fact that no change in steam pressure has occurred and because the lever 25, therefore, remains stationary, this expansion of said capsular spring 24 exerts a pressure upon the adjustable screw 29 which causes the water-level lever 30 to rock on its pivot 31 and press the valve stem 39 inwardly and thus move the ball 36 nearer to the seat 37. In this manner the air pressure which reaches the diaphragm motor valve 35 is reduced with the result that said valve 35 is opened up to a greater extent by the action of the spring, thus increasing the volume of water which is pumped into the boiler 10 by the pump 16 and restoring the water to its intended level indicated by the line $a$; it will be understood that the pump 16 in the example illustrated is constantly running when the boiler is in operation. As the water level in the chamber 19 is correspondingly raised thus submerging more of the bulb 22 and decreasing the surface area thereof which is exposed to the steam in said chamber the bulb temperature will be lowered. This brings about a contraction of the capsular spring 24, which contracting movement is followed up by the screw 29 under the action of the spring 30ª and causes a return rocking of the lever 30 whereby the stem 39 is relieved, thereby permitting the ball 36 to be moved by the air pressure, toward the seat 38. This opens up the air connection and increases the pressure upon the diaphragm of the valve 35 which is, consequently, moved toward its closed position against the tension of its spring, thereby reducing the volume of water which passes through the pump 16. If the continued rise in the water level is sufficient to completely submerge the bulb 22 in the chamber 19, the resulting contraction of the capsular spring 24 will be sufficient to actuate the lever 30 in a manner to permit full air pressure to reach the valve 35 and fully close the same thus completely shutting off the water supply to the pump 16 and boiler 10. As the water level then gradually recedes because of the formation of steam, the bulb 22 will again be gradually uncovered and the supply of water to the pump will be gradually restored, as will be apparent.

When the steam pressure increases without a change in the water level in the boiler, the capsular spring 46 of the pressure regulating portion of the regulating unit, is expanded by the increased pressure through the pipe 48. This expansion lifts the screw 45 and rocks the lever 41 on its pivot 42 in a direction to cause its one end to press upon and depress the cam 40 whereby the intermediate lever 25 is pivotally rocked in a direction to raise the capsular spring 24 relatively to the screw 29 of the water level lever 30. The extent to which the capsular spring 24 is lifted is sufficient to neutralize, with respect to the screw 29, the expansion of said capsular spring 24 due to the increased temperature at the bulb 22 produced by the higher steam pressure acting upon said bulb. The expansion of said capsular spring 24 therefore has no effect to rock the lever 30, with the result that the position of the valve 35 remains unchanged and the level of the water remains normal. As the pressure lever 41 is rocked as described to cause its one end to depress the cam 40 its other end will be coincidentally moved away from the valve stem 49 so that the ball 52 of the air valve 50, by the action of the air pressure, is away from the seat 53 thus opening up the air connection 50ª and increasing the pressure upon the diaphragm of the diaphragm motor valve 51. The latter is thereby moved toward its closed position, against the tension of its spring, and consequently the supply of air to the burner 13 is reduced and the size of the flame is cut down, from which it follows that the steam pressure will finally drop back to normal. If the steam pressure decreases and there is no change in the water level, the lower temperature at the bulb 22 resultant from the lower steam pressure likewise has no effect upon the feed-water valve 35 because the contraction of the capsular spring 24 following the aforesaid lower temperature is neutralized by the rocking of the intermediate lever 25 whereby said capsular spring 24 is moved toward the screw 29 a sufficient distance to compensate for said contraction. That is to say, as the steam pressure decreases the capsular spring 46 will contract and will permit the steam pressure lever 41 to be rocked by the spring 44 in a direction to move its one end away from the cam 40 thereby also permitting said spring to rock the intermediate lever 25 in a direction to cause the contraction of the capsular spring 24 to be without effect upon the water level lever 30. At the same time, however, the opposite end of the lever 41, because of the described rocking, presses upon and forces inwardly the stem 49 of the air valve 50 whereby the ball 52 is moved toward the seat 53 and thus reduces the air pressure upon the diaphragm of the motor valve 51; the latter is thus opened up under the influence of its spring and the air supply to the burner 13 is increased whereby the flame is intensified and the steam pressure is restored to normal.

In the foregoing description of operation, it has been assumed, for the sake of clarity, that either the steam pressure or water level remained constant and that only one or the other increased or decreased. However, in actual practice, the water level may either rise or fall, coincident with a rise or fall in the steam pressure in which case, a combination of the operations described would of course occur. It is not considered necessary to describe in detail the various combination of movements which take place, for instance, when both the water level and steam pressure rise, when the water level rises and the steam pressure falls, when the water level falls and steam pressure rises, or when both the water level and steam pressure fall. In order to prevent possible misunderstanding or doubt, the following description is added to make clear the operation of the device under the common condition in which both the steam pressure and water level fall; from this description the other combination of movements will be clearly apparent.

As the temperature at the bulb 22 decreases because of the fall in steam pressure and consequent lower equivalent temperature of the steam in the chamber 19, said decrease, if the water level remained unchanged, would be neutralized as previously set forth because the contraction of the capsular spring 46 caused by the reduction in steam pressure would bring about an actuation of the intermediate lever 25 whereby the capsular spring 24 would be lowered to an extent corresponding to the expansion of said capsular spring 24 under the higher temperature immediately preceding the drop in pressure. However, as the water level is also falling, a greater surface area of the bulb 22 is being exposed to the effect of the steam, thus subjecting the bulb to the effects of a larger amount of low pressure steam and, consequently, bringing about a higher temperature at said bulb and expanding capsular spring 24 to a greater degree from the effect of said greater exposure to the steam. The air pressure on the diaphragm of the motor valve 35 is, consequently, decreased and the latter, consequently, opens further by the action of its spring, thus increasing the volume of water to the pump and to the boiler whereby the water level is restored to normal. At the same time the action of the lever 41 upon the valve 50 brings about a further opening of the motor valve 51 to increase the supply of air (and consequently of fuel also) to the burner 13 whereby the flame is increased in intensity and the steam pressure is also returned to its intended normal degree.

In the operation of the controller, the valve stem 49 is pushed inwardly in the valve 50 by means of the plunger 61 carried by the lever 41, it being understood that the spring 63 is of sufficient strength to resist any normal tendency of the stem 49 to press the plunger 61 inwardly of the bushing 55. If, however, the contraction of the capsular spring 46 is sufficient to cause a continued rocking of the lever 41 after the stem 49 has been forced inwardly of the valve 50 as far as it will go, the resistance of the spring 63 is overcome whereby the plunger 61 is permitted to yield relatively to the lever 41. This arrangement prevents disarrangement of the parts and at the same time permits the movements of the lever 41, throughout their entire range, whatever this may be, to be accurately reflected in or communicated to the cam 40 and lever 25; the efficiency of the device is thereby increased to a maximum extent.

It may be mentioned that as the relative degrees of temperature and equivalent pounds of steam pressure do not increase uniformly, but that a uniform increment in pressure is equivalent to a constantly lesser increment in temperature, it may be necessary, depending upon the type of thermostat used and the range of the steam pressure to be controlled, to so arrange the automatic regulating unit that the movement of the pressure lever 41 will actuate the intermediate lever 25 in accordance with the lesser temperature decrement above referred to. There are various means whereby this may be provided for, one of which is shown by way of example in Fig. 4 and illustrates the cam 40 positioned and fashioned in a manner to meet the existing requirements.

The face of said cam may also be of such contour as will permit a lower water level to be carried when the steam pressure is low and a higher water level when the steam pressure is high, thus creating (when there is a lesser demand for steam) a reserve consisting of a larger body of water of higher temperature in the boiler for an increased steam demand later on, and vice versa.

As previously stated herein the arrangement shown in Fig. 1 may be varied in many ways and adapted for operative combination with other structures without affecting the efficiency of the device as an automatic controller.

Thus, instead of throttling the air supply and varying the volume of water which reaches the feed water pump as in Fig. 1, the arrangement shown in Fig. 5 may be utilized. In the latter illustration the boiler 10 is heated by means of an oil burner 13$^a$ which is supplied with liquid fuel under pressure through a pipe 14$^a$ and which is not connected with an air supply for atomizing the fuel, the latter in this case being simply sprayed from the burner. The diaphragm motor valve 51 of Fig. 1 located in the air line is replaced by a similar valve 51$^a$ located in the fuel line 14$^a$ and connected with the controller as in Fig. 1 by means of a pipe 50$^a$, the operation and control of said valve 51$^a$ being the same as that of the valve 51. In the example shown in Fig. 5, the pump 16$^a$ is provided with a by-pass 18$^a$ and with valves 35$^a$ and 35$^b$ located respectively in the connection 18 from the pump to the boiler, and in said by-pass;

these valves are actuated by means of a lever 35$^c$ controlled by a diaphragm motor 35$^d$ connected by means of a pipe 34 with the controller in the same way that the motor valve 35 of Fig. 1 is connected. With this arrangement, when the regulating unit or controller permits compressed air to enter the diaphragm motor 35$^d$ in the manner previously described with respect to the valve 35 of Fig. 1, the lever 35$^c$ is rocked to begin the closing of the valve 35$^a$ and the opening of the valve 35$^b$; as the air pressure increases, the valve 35$^a$ will be closed more and more while the valve 35$^b$ will be correspondingly opened up, the reverse being true as the pressure decreases. As a result of this, the pump 16$^a$ will deliver water to the boiler in accordance with the extent to which the valve 35$^b$ permits and prevents the by-passing of the boiler feed water through the by-pass 18$^a$.

In Fig. 6, the regulating unit is shown in direct connection with the valve 35 and in a form in which it serves only as a self-adjusting thermostat whereby the water level is regulated without, in addition, also regulating the steaming rate of the boiler, thus differing to this extent from the form shown in Fig. 1.

Figure 7:
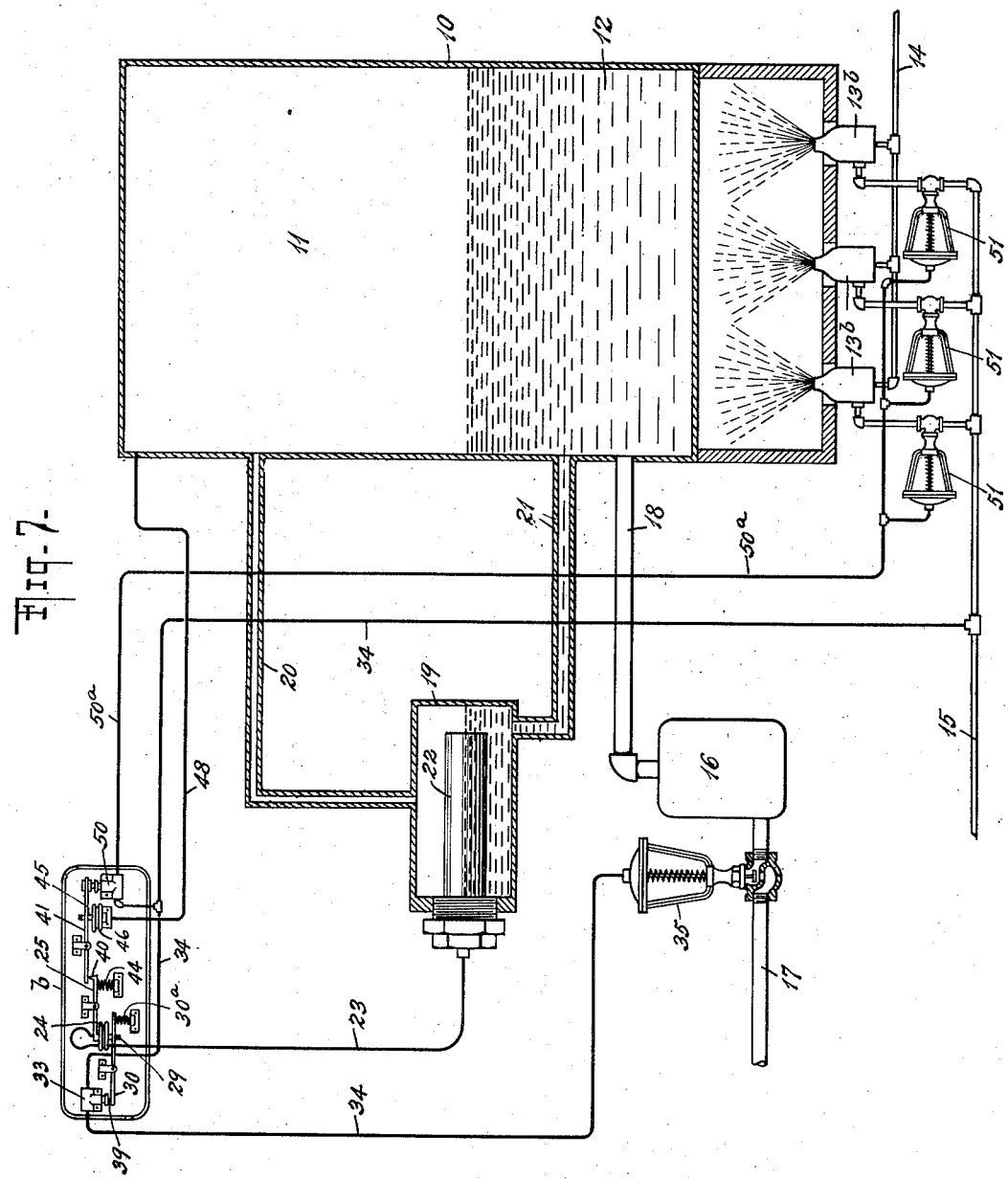

The arrangement illustrated in Fig. 7 shows how the regulating unit may be used to increase and diminish the heat supply to the boiler 10 by bringing a plurality of burners 13$^b$ into operation and shutting them off, in the same way that the flame of the single burner 13 of Fig. 1 is controlled.

Figure 8:
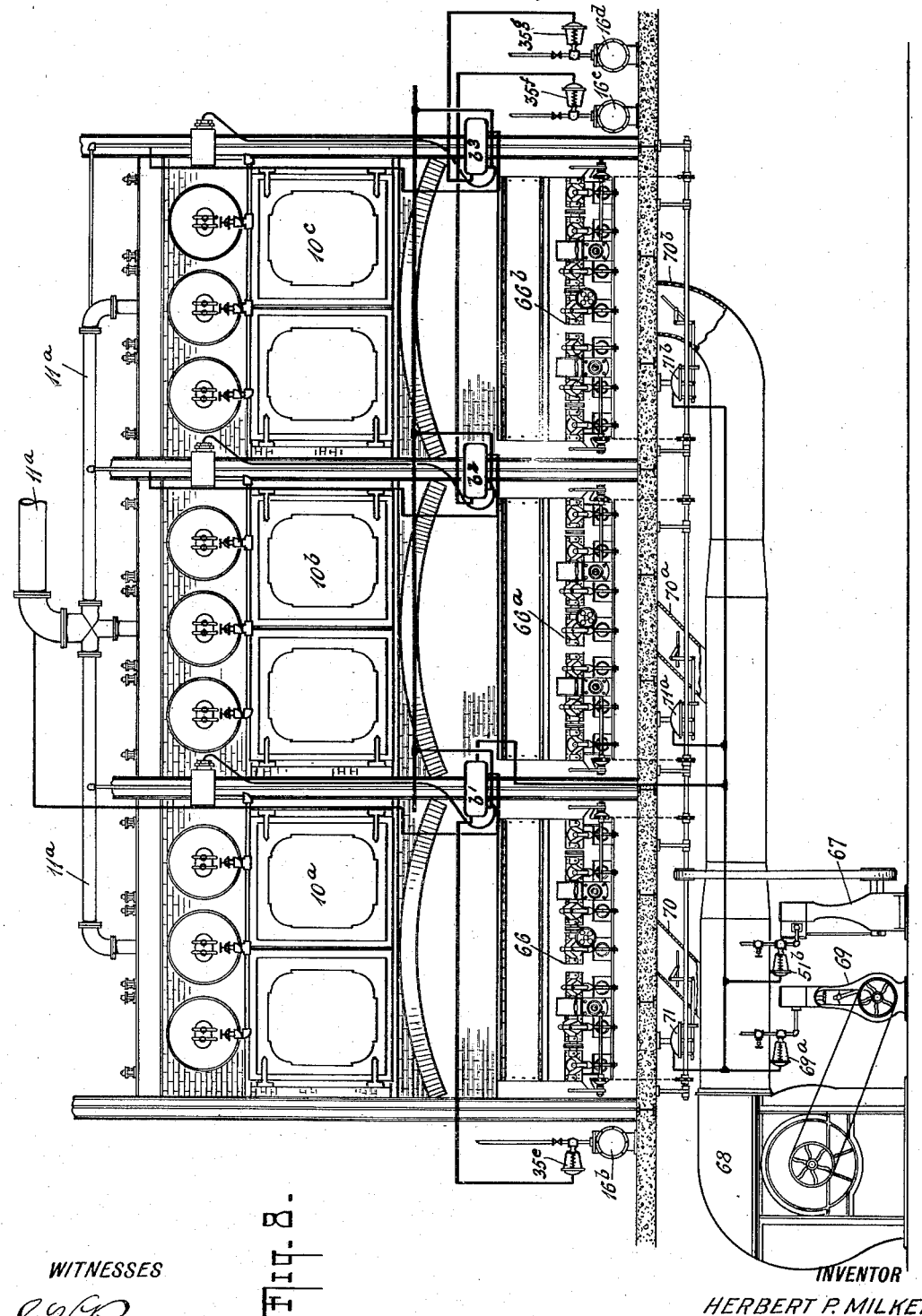

In Fig. 8 is shown an application of the invention to a stationary steam power plant, the illustrated example disclosing boilers with coal fired furnaces supplied with fuel by automatic stokers; it will be understood that while the regulating unit is shown in the same form as previously indicated, namely, of distance type (air operated), the thermostat portion of said unit may be of any other suitable construction and attached in any other convenient manner. In the arrangement shown, a battery of boilers is represented by the individual boilers 10$^a$, 10$^b$ and 10$^c$, all communicating with the steam main 11$^a$ and each fired respectively by stokers 66, 66$^a$ and 66$^b$, which may be of any recognized type and which, in the illustration, are driven by a suitable engine 67; each of the boilers is supplied with water by the feed pumps 16$^b$, 16$^c$ and 16$^d$ respectively. Furnace draft for the battery of boilers may be supplied by means of a fan 68 driven by the blower engine 69, each individual furnace being supplied through ducts 70, 70$^a$ and 70$^b$ respectively. Three automatic regulating units $b^1$, $b^2$ and $b^3$ are shown which may correspond in general construction and arrangement with the unit shown in Figs. 1 and 2, and which in the same way may each maintain the water level in the boiler to which it is attached, and one of which, for instance, the unit $b^1$, may also maintain a uniform steam pressure in the main 11$^a$. This is accomplished by admitting more steam, through the proper automatic actuation of the diaphragm motor valve 51$^b$, to the stoker engine 67, thereby speeding up the latter and accelerating the stokers 66, 66$^a$ and 66$^b$ and at the same time admitting more steam, through the proper automatic operation of the diaphragm motor valve 69$^a$ to the blower engine 69 and thus speeding up the latter to accelerate the fan 68 and, in addition, by the automatic actuation of the diaphragm motor levers 71, 71$^a$ and 71$^b$ causing dampers in the ducts 70, 70$^a$ and 70$^b$ to open wider, thereby increasing the draft to the furnaces when the steam pressure falls, the reverse operations taking place when said pressure rises. The arrangement may further include a common up-take damper operated synchronously with the dampers in the ducts 70, 70$^a$ and 70$^b$ by a diaphragm motor lever, such as indicated at 71.

The regulating units $b^1$, $b^2$ and $b^3$ maintain a uniform water level in the boilers by automatically actuating the diaphragm motor valves 35$^e$, 35$^f$ and 35$^g$, located respectively in the steam supply lines of the feed water pumps 16$^b$, 16$^c$ and 16$^d$ and serving to open, close or throttle said lines whereby the pumps are accelerated or retarded or started and stopped as required.

The operation of the regulating units $b^1$, $b^2$ and $b^3$ is similar to that of the regulating unit $b$ previously described and accordingly need not be repeated.

Figure 9:
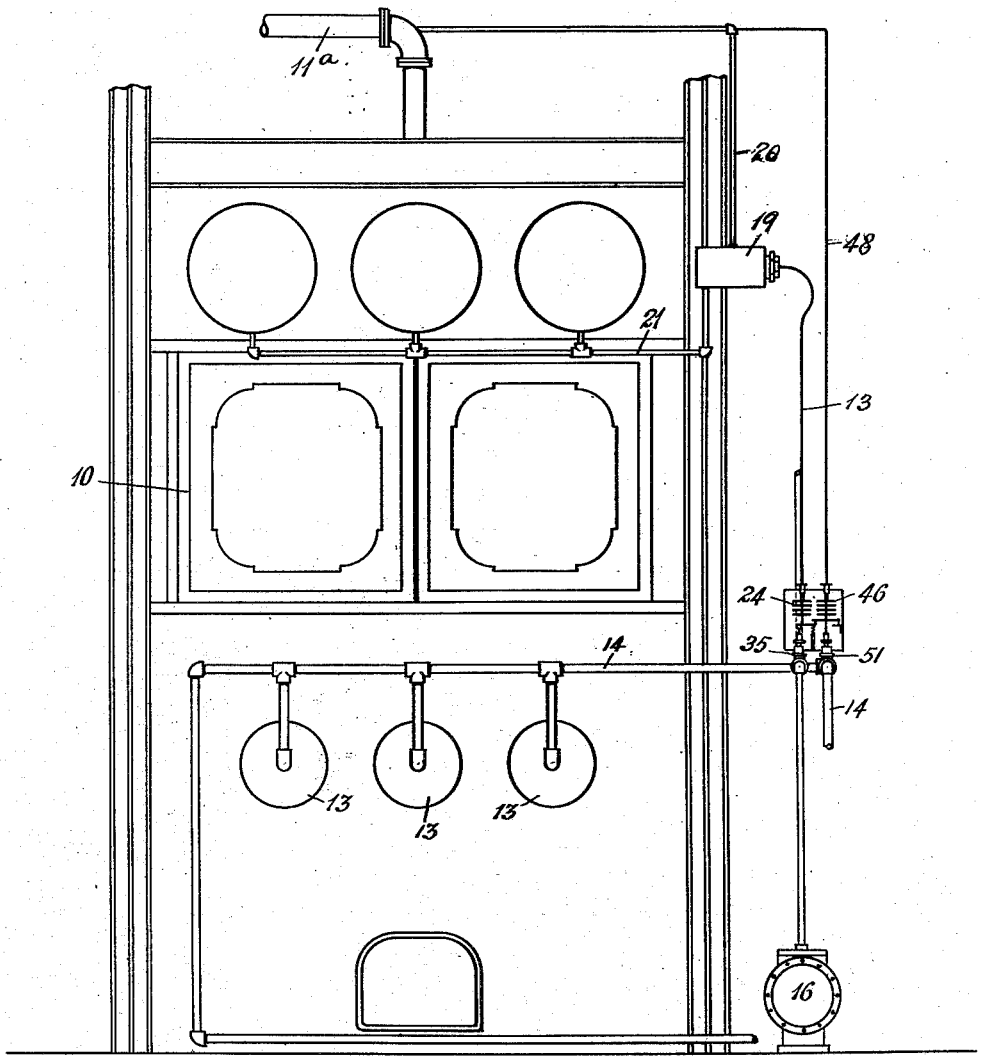

Fig. 9 illustrates another power plant variation which illustrates the invention operatively combined with an oil burner equipment as commonly applied to a stationary or marine installation. The operation will be clear from the description with respect to Figs. 1 and 2.

In Fig. 10 is illustrated an automatic regulating unit $b^4$ which, in all respects, is similar to the unit $b$ of Figs. 1 and 2 excepting that instead of having the capsular spring or other thermostatic expanding and contracting member 24 "floating" and carried by the intermediate lever 25 at one end thereof, the said capsular spring or its equivalent is stationary while the air valve 33 is "floating" and carried by the intermediate lever 25. The operation of the unit and the results achieved thereby are the same as in Fig. 2. In the unit $b^4$ of Fig. 10 the air line 34 is made flexible where it connects with the valve 33, as indicated at 34$^a$ and 34$^b$ to permit, without hindrance, the necessary floating movements of the air valve 33 under the action of the levers 25 and 41.

In the regulating unit $b^5$ illustrated in

Fig. 11, both the air valve 33 and capsular spring 24 or its equivalent occupy fixed positions while the pivot or fulcrum 31 of the water level lever 30 is "floating" by being connected with the intermediate lever 25. By the action of the pressure end of the regulating unit as previously described, this fulcrum is shifted to change the functioning point of the thermostat.

The different illustrated examples show that the invention is capable of being incorporated in a plurality of different mechanical variations, it being understood that still other arrangements are possible without affecting the efficiency of the apparatus.

It is further obvious that, instead of using a pressure chamber for the pressure regulating end of the unit whereby the functioning point of the water regulating thermostat is changed because of the change of temperature of the steam due to a change in steam pressure in the boiler, a second thermostat could be utilized for automatically changing the functioning point of said water level regulating thermostat.

Such an arrangement is shown in Fig. 12 in which the regulating unit $b^6$ includes two thermostats, instead of a thermostat unit and a pressure unit, as in the forms previously described. In said Fig. 12, $22^a$ is a second thermostatic bulb and $23^a$ is the flexible connecting tube communicating with said bulb and with the expanding and contracting member $46^a$, which serves the same purpose as the member 46 of Fig. 2. In the construction illustrated in Fig. 12, the cam 40 is shaped to meet any individual peculiarities which may exist in the two members 24 and $46^a$ and further is so arranged and constructed that the action of member $46^a$ will not entirely neutralize the action of member 24, but will allow the expansion and contraction of member 24, caused by the bulb 22 being either entirely covered by steam or entirely covered by water, instead of half covered by each, to cause the thermostat to function in a manner to only offset further expansion or contraction caused by a change in the steam. If a regulating unit such as shown in Fig. 12 is desired only for water level regulation, the bulbs 22 and $22^a$ are located accordingly, but if steam regulation is also desired, then bulb 22 should be located outside of the boiler as in Fig. 1 and bulb $22^a$ should be located within the steam space of the boiler at a point where no superheating effect is obtained. The construction otherwise and the operation of this form may be the same as the arrangement of Fig. 2.

Furthermore, the regulating unit shown by Fig. 12 could be so arranged that, instead of member 24 being "floating" or shifting, other portions of the mechanism may be constructed to be shifted instead, to change the functioning point, all in a manner similar to the various ways already mentioned.

Fig. 13 shows one method of constructing a self-operating regulating unit in a form which does not utilize an auxiliary motive force for regulating the fuel supply. $22^b$ is a thermostatic bulb, $23^b$ a flexible connecting tube, $24^b$ an expanding and contracting member, all functioning in like manner to the similar members included in previous illustrations. In the present instance, however, the member $24^b$ directly operates the lever $30^a$ with which latter, the member $24^b$ contacts at 72 at all times under the influence of the spring $30^b$. The valve stem 73 is caused to move upward, when permitted by the member $24^b$, by the customary spring within the bonnet 74. The valve $35^h$ is of the balanced type and controls the feed water line 17 (Fig. 1, etc.); $48^a$ is the pressure connection for the pressure end of this self-operating regulating unit, communicating with member $46^b$ which influences the thermostat lever $30^a$ through the medium of the lever $25^a$ and also operating the valve $51^c$ whereby the air supply is regulated.

Obviously, the mechanical construction of the self-operating regulating unit last described may be readily changed to effect an alteration in the functioning point of the thermostat in the various ways already mentioned in connection with previously described regulating units. Also such self-operating regulating unit may employ two thermostats, if desired, in the manner already disclosed in connection with Fig. 12.

For application to apparatus other than steam boilers, the invention is usually in the form shown in Fig. 12 to meet the condition where the space above the liquid level may simply be occupied by air or vapor instead of by steam under pressure. An example of such apparatus with the invention operatively combined therewith is shown diagrammatically in Fig. 14, in which $10^d$ may represent a hot water tank, $12^a$ the water therein and $a'$ the water level which it is desired to maintain. The tank $12^a$ may be heated in any convenient manner as by means of steam introduced directly into said water through a perforated steam coil $13^c$ located within the tank $10^d$ and supplied with steam through the steam supply line $15^a$. The latter is controlled by means of a diaphragm motor valve $51^a$ from which a pipe $50^b$ leads to the regulating unit $b^6$ in the same way as previously described. Cold water is fed into the tank $10^d$ by means of a feed pump 16 of any conventional type and connected with a water supply by a pipe 17 in which the diaphragm motor valve 35 is located and with the tank $10^d$ by a pipe 18; the hot water outlet is indicated at $18^a$.

In this case no auxiliary chamber such as 19 for containing the thermostatic bulb of the water level regulating unit is required, as said bulb 22 may project directly into the hot water tank $10^d$ at a point corresponding to the water level $a'$ which it is desired to maintain. As the water level rises a greater portion of the bulb 22 becomes subject to the temperature of the hot water with the result that the thermostat will cause the diaphragm motor valve 35 to close, thus preventing the pump 16 from further increasing the cold water supply. If the water level drops, a greater portion of the bulb 22 is uncovered and exposed to the relatively cooler vapors and air above the water level so that the thermostat will cause the valve 35 to open and thus permit the pump 16 to augment the water supply in the tank $10^d$. However, if the temperature of the water partly covering the bulb 22 changes, means must be provided to change the setting point of said thermostat and this is done automatically by means of an additional thermostatic unit having its bulb $22^a$ as shown below the water level line and which may also control the steam supply to the tank for keeping the temperature uniform but which, when uniformity of temperature is impossible of achievement, automatically changes the setting point of the water level thermostatic unit. It is to be understood, of course, that while the additional thermostat for keeping the temperature in the tank uniform in theory will make it unnecessary to cause a change in the setting point of the water level controller, conditions may be such that they are beyond the control of the temperature thermostatic unit, because demands on the heating capacity of the tank $10^d$ may be in excess, etc.; consequently, if two separate thermostats were used, one for water level regulation and the other for temperature regulation, the setting point of the water level controller would have to be changed manually in such case. Furthermore, it is often necessary to change the desired temperature of the water supplied by the tank $10^d$ to meet various conditions and in that case it would be necessary to change by hand both the setting point of the water level thermostat and the temperature regulating thermostat and, in addition, make such changes so that both units would still be " in step ". With the combined unit as set forth herein, the need for such manual adjustment is done away with and consequently time and labor are saved and greater accuracy of results achieved without any particular increase in expense because the two units are simply combined as described.

A combination unit consisting of two thermostats may also be used for water level regulation alone, the second thermostat serving simply to adjust the setting point of the water level unit.

The controller, in all of its forms, is simple in construction and efficient in operation and provides for the automatic regulation of the water level and steam pressure in steam boilers or the liquid level regulation in other apparatus in a reliable manner and without the necessity for continuous supervision on the part of anyone.

Various changes in the specific form shown and described may be made within the scope of the claims without departing from the spirit of my invention.

I claim:

1. The combination of a container holding a gaseous fluid and a liquid, means for supplying said liquid to said container, thermo-sensitive means tending to automatically control said supplying means to maintain said liquid at a predetermined level in said container and means whereby the effects of physical changes in one or both of said fluids upon said thermo-sensitive means and tending to affect the operation thereof are neutralized.

2. The combination of a container holding a gaseous fluid and a liquid, means for supplying said liquid to said container, thermo-sensitive means tending to automatically control said supplying means to maintain said liquid at a predetermined level in said container and means whereby the effects of temperature changes in one or both of said fluids upon said thermo-sensitive means and tending to affect the operation thereof are neutralized.

3. The combination of a container holding a gaseous fluid and a liquid, means for supplying said liquid to said container, thermo-sensitive means tending to automatically control said supplying means to maintain said liquid at a predetermined level in said container, adjusting mechanism operatively combined with said thermo-sensitive means and an expansible and contractable member responsive to physical changes in one of said fluids and actuating said mechanism to automatically adjust the operation of said thermo-sensitive means in a manner to neutralize the effect of said changes on the thermo-sensitive means.

4. The combination of a container holding a gaseous fluid under pressure and a liquid, means for supplying said liquid to said container, means tending to automatically control said supplying means to maintain said liquid at a predetermined level in said container and means responsive to changes in the pressure of said gaseous fluid to automatically adjust the operation of said controlling means in a manner to neutralize the effects of said pressure changes on said controlling means.

5. In an automatic controller for steam boilers, the combination of thermostatic means sensitive to the temperature of the steam in the boiler to maintain a predetermined water level therein and mechanism controlled by the steam pressure in said boiler to automatically adjust the operation of said thermostatic means to neutralize the effect of the variations in said steam pressure on said thermostatic means.

6. In an automatic controller for steam boilers, the combination of means for generating steam therein, thermostatic means sensitive to the temperature of the steam in the boiler to maintain a predetermined water level therein, adjusting mechanism operatively combined with said means, controlling means for the steam generating means, and an expansible and contractable member controlled by the steam pressure in said boiler and actuating said adjusting mechanism to automatically adjust the operation of said thermostatic means to neutralize the effect of the variations in said steam pressure on said thermostatic means and to operate the controlling means to automatically restore the pressure of said steam.

7. In an automatic controller for steam boilers, the combination of means to automatically maintain a predetermined water level in the boiler, heat producing means for converting said water into steam and mechanism controlled by the steam pressure in said boiler for automatically adjusting the operation of the water level maintaining means to neutralize the effect of the variations in said steam pressure on said water level maintaining means and for concurrently regulating said heat producing means in a manner to overcome said variations in steam pressure and to thereby restore the predetermined steam pressure in said boiler.

8. In an automatic controller for steam boilers, the combination of regulating means including a movable element for automatically maintaining a predetermined water level in the boiler, and mechanism controlled by the steam pressure in said boiler for adjusting said movable element to automatically change the operation of said regulating means to neutralize the effect of the variations in said steam pressure upon said regulating means.

9. In an automatic controller for steam boilers, the combination of means for supplying water to the boiler, a water level device controlling said supplying means for automatically maintaining a predetermined water level in said boiler, a steam pressure device controlled by the steam pressure in said boiler and a movable element located in operative relation to said devices, said movable element being adjusted by said pressure device to automatically change the operation of said water level device to neutralize the effect of the variations in said steam pressure upon said water level device.

10. In an automatic controller for steam boilers, the combination of means for supplying water to the boiler, a water level device controlling said supplying means for automatically maintaining a predetermined water level in said boiler, a steam pressure device controlled by the steam pressure in said boiler, a movable element located in operative relation to said devices, said movable element being adjusted by said pressure device to automatically change the operation of said water level device, to neutralize the effect of the variations in said steam pressure upon the water level device and means for heating said boiler, regulated by said steam pressure device concurrently with the adjustment of said movable element whereby said variations in steam pressure are overcome and the predetermined pressure in said boiler is automatically restored.

11. In an automatic controller for steam boilers, the combination of means for supplying water to said boiler, controlling mechanism for controlling said supplying means to automatically maintain a predetermined water level in said boiler, thermostatic means for actuating said controlling mechanism in accordance with variations in said water level to automatically restore the same to said predetermined level, a member sensitive to the steam pressure in said boiler, and a steam pressure device operated thereby to automatically effect a relative adjustment between said thermostatic means and said controlling mechanism for automatically neutralizing the effect of variations in the steam pressure upon the thermostatic means.

12. In an automatic controller, the combination of a water lever controlling mechanism, thermostatic means for actuating said controlling mechanism, a pressure sensitive member, and a pressure device operated by said pressure sensitive member to effect a relative adjustment between said thermostatic means and said controlling mechanism to vary the operation of the latter in a manner to neutralize the effect of variations in pressure on said thermostatic means.

13. In an automatic controller, the combination of a valve, a lever for operating said valve, means sensitive to pressure variations effective thereon for actuating said lever to effect an operative adjustment of said valve, a pressure sensitive member subject to the effects of the aforesaid pressure variations, means combined with said pressure sensitive member to constitute a control adapted to automatically bring the adjustment of said valve as effected by said valve lever into accord with variations in the aforesaid pressure as they occur.

14. In an automatic controller for steam boilers, the combination of a chamber located at a distance from the boiler and connected with both the water space and steam space of said boiler, a thermostatic member extending into said chamber and having its longitudinal axis in registry with the predetermined water level to be maintained in said boiler, means for supplying water to the boiler, regulating means connected with said thermostatic member to control said water supply in accordance with the temperature variations of said thermostatic member following changes in said water level and means connecting the steam space of said boiler with the regulating means to automatically adjust the regulating means to maintain a constant water level.

15. In an automatic controller for steam boilers, the combination of a chamber located at a distance from the boiler and connected with both the water space and steam space of said boiler, a thermostatic member extending into said chamber and having its longitudinal axis in registry with the predetermined water level to be maintained in said boiler, means for supplying water to the boiler, a water level lever controlling said water supplying means, an expansible and contractible member connected with said thermostatic member for actuating said lever to control said water supply in accordance with temperature variations at said thermostatic member following changes in said water level, an expansible and contractible member subject to the steam pressure in said boiler and means combined with said expansible and contractible member to constitute a control for effecting a relative adjustment between said water level lever and its cooperating expansible and contractible member to automatically adjust the operation of the water level lever in a manner to neutralize the effect of the variations in said steam pressure on the thermostatic member.

16. In an automatic controller for steam boilers, the combination of a boiler, a chamber located at a distance therefrom and connected with both the water space and steam space of said boiler, a thermostatic member extending into said chamber and having its longitudinal axis in registry with the predetermined water level to be maintained in said boiler, means for supplying water to the boiler, a water level lever controlling said water supplying means, an expansible and contractible member connected with said thermostatic member to actuate said lever to control said water supply in accordance with temperature variations at said thermostatic member following changes in said water level, an intermediate lever carrying said expansible and contractible member, a pressure lever, and an expansible and contractible member connected with the steam space of said boiler to actuate said pressure lever and operate said intermediate lever to adjust the position of said first named expansible and contractible member relatively to said water level lever and automatically adjust the operation of the water level lever in a manner to neutralize the effect of the variations in the steam pressure in said boiler on the thermostatic member.

17. In an automatic controller for steam boilers, the combination of a boiler, a chamber located at a distance therefrom and connected with both the water space and steam space of said boiler, a thermostatic member extending into said chamber and having its longitudinal axis in registry with the predetermined water level to be maintained in said boiler, means for supplying water to the boiler, a water level lever controlling said water supplying means, an expansible and contractible member connected with said thermostatic member to actuate said lever to control said water supply in accordance with temperature variations at said thermostatic member following changes in said water level, an intermediate lever carrying said expansible and contractible member, a pressure lever, a second expansible and contractible member controlling said pressure lever and a second thermostatic member extending into the steam space of said boiler and connected with said second expansible and contractible member to actuate the latter to operate said pressure lever and intermediate lever to adjust the position of said first named expansible and contractible member relatively to said water level lever and automatically adjust the operation of the water level lever in a manner to neutralize the effect of the variations in the steam pressure in said boiler on the thermostatic member.

18. In an automatic controller for steam boilers, the combination of a boiler, a chamber located at a distance therefrom and connected with both the water space and steam space of said boiler, a thermostatic member extending into said chamber and having its longitudinal axis in registry with the predetermined water level to be maintained in said boiler, means for supplying water to the boiler, means for heating said boiler, regulating means connected with said thermostatic member for controlling said water supply in accordance with temperature variations at said member following changes in said water level and means connected with the steam space of said boiler for automatically bringing the operation of the regulating means into accord with variations in the steam pressure in said boiler and for concurrently regulating said heating means to neutralize the effect of the variations in the steam pressure on the thermostatic member.

19. An automatic controller comprising a base, a pair of levers pivotally mounted thereon, an intermediate lever pivoted upon said base, and engaging one of said levers, a first expansible and contractible member carried by said intermediate lever for actuating the other of said pair of levers and a second expansible and contractible member mounted upon said base for operating said one lever and said intermediate lever to automatically adjust the operative relation of said first expansible and contractible member to said other lever.

20. An automatic controller comprising a base, a pair of levers pivotally mounted thereon, an intermediate lever pivoted upon said base and engaging one of said levers, a first expansible and contractible member carried by said intermediate lever for actuating the other of said pair of levers, a second expansible and contractible member mounted upon said base for operating said one lever and said intermediate lever to automatically adjust the operative relation of said first expansible and contractible member to said other lever, a thermostatic bulb connected with said first expansible and contractible member and a tubular connection communicating with said second expansible and contractible member.

21. In an automatic controller, the combination of a water level controlling mechanism, means sensitive to pressure variations effective thereon for automatically actuating said controlling mechanism to maintain a predetermined water level, a pressure operated device for effecting a relative adjustment between said automatic means and said water level controlling mechanism to vary the operation of the latter and means cooperating with said pressure operated device to automatically neutralize the effect of the aforesaid variations in pressure upon said automatic means.

22. In an automatic controller, the combination of a water level controlling mechanism, means sensitive to pressure variations effective thereon for automatically actuating said controlling mechanism to maintain a predetermined water level, a pressure operated device for effecting a relative adjustment between said automatic means and said water level controlling mechanism to vary the operation of the latter and a cam cooperating with said pressure operated device to automatically neutralize the effect of the aforesaid variations in pressure upon said automatic means.

In testimony whereof I have hereunto set my hand.

HERBERT P. MILKER.